(12) United States Patent
Imai

(10) Patent No.: US 6,948,373 B2
(45) Date of Patent: Sep. 27, 2005

(54) INLINE PRESSURE SENSOR

(75) Inventor: Hiroshi Imai, Gyoda (JP)

(73) Assignee: Surpass Industry Co., Ltd. (JP)

( * ) Notice: Subject to any disclaimer, the term of this patent is extended or adjusted under 35 U.S.C. 154(b) by 0 days.

(21) Appl. No.: 10/871,071

(22) Filed: Jun. 18, 2004

(65) Prior Publication Data
US 2004/0255645 A1 Dec. 23, 2004

(30) Foreign Application Priority Data

Jun. 20, 2003 (JP) .................................... P 2003-176422

(51) Int. Cl.[7] .............................................. G01L 7/08
(52) U.S. Cl. ...................................................... 73/715
(58) Field of Search .......................... 73/715, 730, 756

(56) References Cited

U.S. PATENT DOCUMENTS

| 4,177,496 A | 12/1979 | Bell et al. | |
|---|---|---|---|
| 4,192,192 A | 3/1980 | Schnell | |
| 4,398,542 A | * 8/1983 | Cunningham et al. | 600/488 |
| 5,693,887 A | 12/1997 | Englund et al. | |
| 5,852,244 A | 12/1998 | Englund et al. | |
| 5,869,766 A | 2/1999 | Cucci et al. | |
| 6,622,564 B2 | 9/2003 | Imai | |
| 6,640,639 B2 | 11/2003 | Okawa | |

FOREIGN PATENT DOCUMENTS

| JP | 61-197534 | 12/1986 |
|---|---|---|
| JP | 3-97639 | 10/1991 |
| JP | 5-33044 | 4/1993 |
| JP | 5187941 | 7/1993 |
| JP | 06-129927 | 5/1994 |
| JP | 07-072029 | 3/1995 |

* cited by examiner

Primary Examiner—Edward Lefkowitz
Assistant Examiner—Corey D. Mack
(74) Attorney, Agent, or Firm—Thelen, Reid & Priest LLP

(57) ABSTRACT

A pressure sensing section and a sensor element are provided in a housing. A pair of coupling ports 12a and 12b are formed at both ends of the housing so as to be aligned with the piping section. A flow path is formed in approximate convex such that the first flow path which switches the flowing direction of the liquid member from an aligned piping section to the pressure sensing section, the second flow path through which the liquid member flows along the pressure sensing section, and the third flow path 13c which switches the flowing direction of the liquid member from the pressure sensing section to the aligned piping section are connected. By doing this, it is possible to provide an inline pressure sensor in which a dead volume as an undesirable liquid pool can be minimized.

6 Claims, 4 Drawing Sheets

INLINE PRESSURE SENSOR

Priority is claimed on Japanese Patent Application No. 2003-176422, filed Jun. 20, 2003, the content of which is incorporated herein by reference.

BACKGROUND OF THE INVENTION

1. Field of the Invention

The present invention relates to an inline pressure sensor for measuring a pressure in a liquid member.

2. Description of Related Art

Conventionally, a pressure sensor has been used for measuring a pressure in a liquid member (liquid or gas) which flows in a piping section. Such a pressure sensor is commonly called a single-port pressure sensor which is attached to a branching piping section which is branched from the piping section for flowing the liquid member. However, in such a single-port pressure sensor, the branching piping section causes a dead volume (liquid pool) in which the liquid member remains undesirably. In such a case, there is a problem if the liquid member decomposes. Also, if an expensive liquid member flows in the piping section, the dead volume in which the liquid member remains undesirably may cause a substantial amount of wasted liquid member; thus, there is a problem in that the unnecessary expense may be incurred.

In order to solve the above problem, an inline pressure sensor has been developed in which a pair of coupling ports are formed at both ends of the pressure sensor such that the coupling ports are disposed via a coupling section so as to be on the same line as the piping section in which the liquid member flows. In such an inline section to which the pressure sensor should be attached.

Such a conventional inline pressure sensor 1 (hereinafter called a "pressure sensor") has a structure shown in a cross section in FIG. 5. According to the pressure sensor 1, a flexible cap member 4 is disposed in a housing 3 which is connected to the piping section which is not shown in the drawing so as to be orthogonal to a coupling member 2 which is connected to the piping section so as to be aligned with the piping section. A liquid 5 such as an antifreeze fluid is sealed in the cap member 4 such that a pressure which is applied on a pressure sensing element 6 in a sensor section via the cap member 4 and the liquid 5 may be measured (see Japanese Unexamined Utility Application, First Publication No. Sho 61-197534, pages 3–9, and FIG. 1). Here, an inner casing space of which the cross sectional area is larger than a cross section of the piping section is formed beneath the pressure sensing element in a flow path in the above conventional inline pressure sensor. A volume in the inner casing space is smaller than that in the branching piping section in the single port pressure sensor. However, such an inner casing space is upwardly blocked while branching upwardly from the flow path which is disposed so as to be aligned with the piping section. Therefore, such an inner casing space may cause a liquid pool in which the liquid member remains undesirably.

If an expensive liquid member is circulated, such a liquid member remaining thereinside increases the dead volume; thus, more liquid member is necessary. Therefore, such a dead volume may cause a substantial amount of waste liquid member; thus, there is a problem in that a unnecessary expense may be incurred. Also, such a liquid member remaining thereinside is not preferable because the liquid member which is supposed to be used for a beverage or a medicine decomposes while remaining thereinside for a long period and this is not desirable. Therefore, it has been desired that an inline pressure sensor be developed which can minimize the dead volume.

SUMMARY OF THE INVENTION

The present invention was made in consideration of the above problems. An object of the present invention is to provide an inline pressure sensor which can minimize the dead volume.

In order to satisfy the above object, an inline pressure sensor of the present invention comprises a housing which is provided with a flow path to which a liquid member flowing in a piping section is lead, a pressure sensing section which is disposed in the housing so as to contact the liquid member which is lead to the flow path, a sensor element which is disposed in the housing so as to measure a stress by contacting the pressure sensing section, a pair of coupling ports which are disposed on both ends of the housing so as to be connected to the piping section such that the flow paths in the coupling ports and the flow path in the piping section are aligned, a first liquid member flow path for switching a direction of the liquid member from the aligned flow path to the pressure sensing section, a second liquid member flow path for flowing the liquid member along the pressure sensing section, and a third liquid member flow path for switching a direction of the liquid member from the pressure sensing section to the aligned flow path. In this aspect of the present invention, it is preferable that the first liquid member flow path, the second liquid member flow path, and the third liquid member flow path be connected in an approximate convex alignment viewed in a cross section.

According to the inline pressure sensor having the above structure, the first liquid member flow path, the second liquid member flow path, and the third liquid member flow path are connected in an approximate convex alignment viewed in cross section in the housing to which the liquid member flows in the piping section. Therefore, it is possible to eliminate or minimize the dead volume which causes a liquid pool in which the liquid member remains thereinside undesirably.

In the inline pressure sensor according to the present invention, it is preferable that the second liquid member flow path be formed such that a distance between a pressure sensing surface on the pressure sensing section and a surface of the housing which faces to the pressure sensing section be smaller than an inner diameter of the piping section.

According to the inline pressure sensor having the above structure, the second liquid member flow path is formed such that a distance between a pressure sensing surface on the pressure sensing section and a surface of the housing which faces to the pressure sensing section be smaller than an inner diameter of the piping section. Therefore, it is possible to eliminate or minimize the dead volume which causes a liquid pool in which the liquid member remains thereinside undesirably because a necessary cross sectional area can be realized. That is, it is necessary to form an area for sensing the pressure larger than a cross sectional area in the flow path so as to realize a desirable sensitivity in the pressure sensor in the sensor section. Therefore, it is preferable that the cross sectional area of the second liquid member flow path be approximately the same as the cross sectional area in the first liquid member flow path and the cross sectional area in the third liquid member flow path by minimizing the distance between a pressure sensing surface on the pressure sensing section and a surface of the housing which faces to the pressure sensing section.

As explained above, according to the inline pressure sensor of the present invention, the flow path in the housing to which the liquid member flowing in the piping section is lead is formed such that the first liquid member flow path which switches a direction of the liquid member from the aligned flow path to the pressure sensing section, a second liquid member flow path for flowing the liquid member along the pressure sensing section; and a third liquid member flow path for switching a direction of the liquid member from the pressure sensing section to the aligned flow path are connected in an approximate convex alignment viewed in cross section in the housing. Therefore, it is possible to eliminate or minimize the dead volume which causes a liquid pool in which the liquid member remains thereinside undesirably. Accordingly, it is possible to prevent the liquid member from decomposing while remaining thereinside for a long period, which is undesirable. Also, a superior effect is realized in that it is possible to reduce or eliminate waste of the liquid member.

Furthermore, according to the above second liquid member flow path, it is possible to form a distance between a pressure sensing surface on the pressure sensing section and a surface of the housing which faces to the pressure sensing section to be smaller than an inner diameter of the piping section. Therefore, it is possible to eliminate or minimize the dead volume which causes a liquid pool in which the liquid member remains thereinside undesirably because a necessary cross sectional area can be realized.

DETAILED DESCRIPTION OF THE INVENTION

Embodiments for a pressure sensor of the present invention are explained with reference to drawings below.

Figure 1:
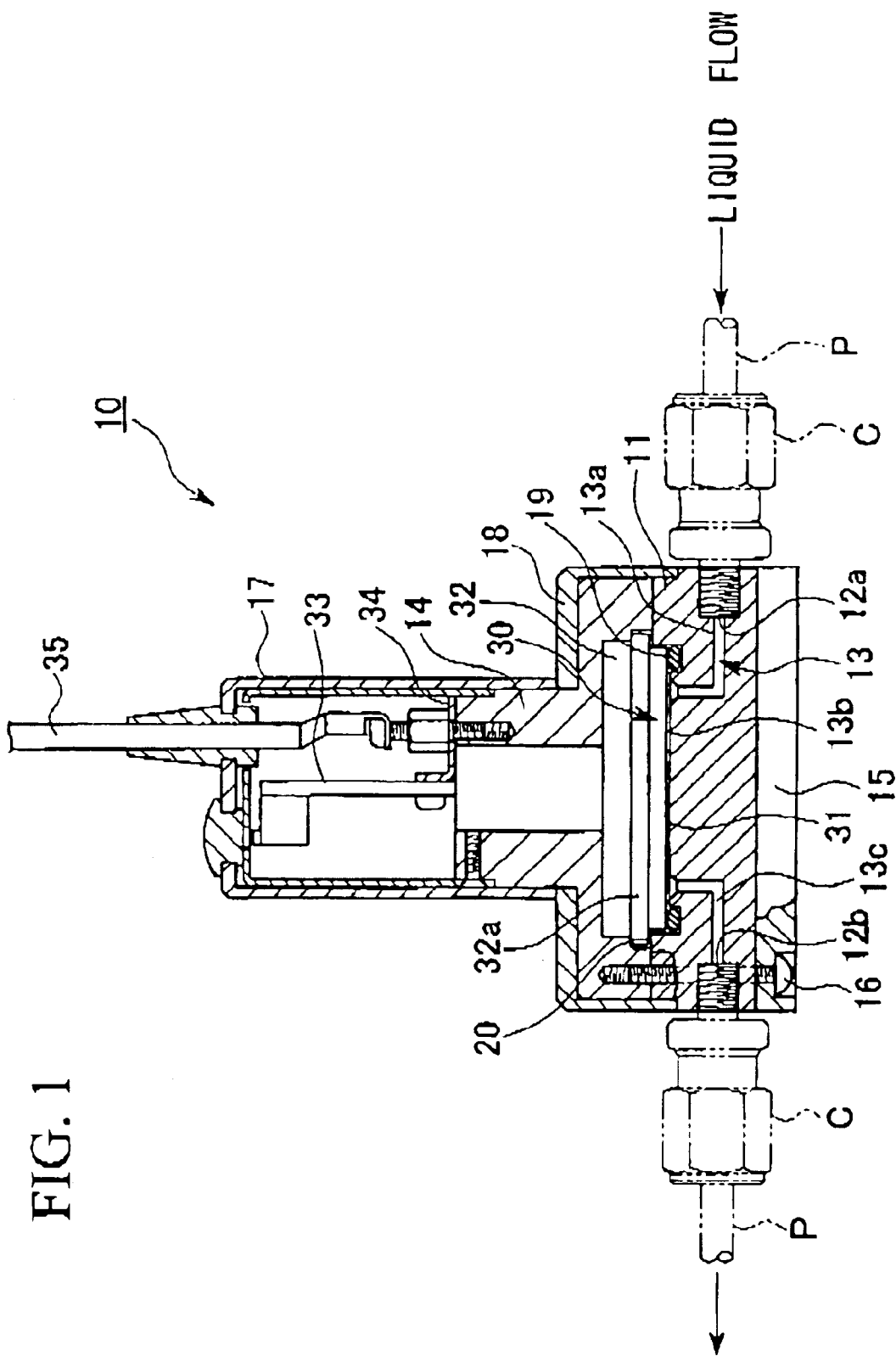
FIG. 1 is a cross section for an embodiment of the inline pressure sensor according to the present invention.
Figure 2:
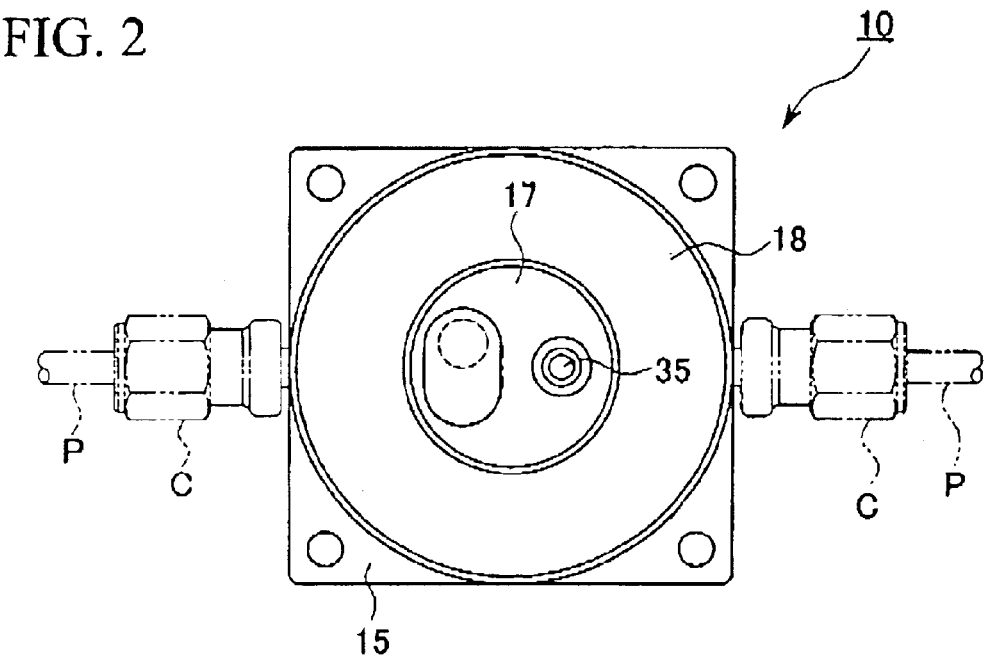
FIG. 2 is a plan view for FIG 1.

An inline pressure sensor (hereinafter called a "pressure sensor") 10 shown in a cross section in FIG. 1 measures a pressure in a liquid member such as a liquid or a gas (hereinafter called a "liquid member") which flows in a liquid member circuit. The inline pressures sensor 10 is connected to a tube which forms a circuit or a piping section P such as a pipe via a coupling member such as a coupling section C. A pair of coupling ports 12a and 12b which introduce the liquid member of which pressure is supposed to be detected into the housing 11 so as to pass therethrough are formed in the housing 11 having a round cross section forming a part of an external view of the pressure sensor 10 so as to be aligned with the piping section P. The cross sectional area of the coupling ports 12a and 12b is the same as the inner cross sectional area of the piping section P. Here, it is acceptable if the cross sectional area of the coupling ports 12a and 12b are approximately the same as the inner cross sectional area of the piping section P. Here, either one of the coupling port is an entrance port for the liquid member. The other one of the coupling port is an exit port for the liquid member. Hereinafter, explanations are made under conditions that the coupling port 12a shown in a right-hand side for the viewer in the drawing is an entrance for the liquid member. Also, the coupling port 12b shown in a left-band side for the viewer in the drawing is an exit for the liquid member.

In addition, a flow path 13 for introducing the liquid member to the pressure sensing section 30 is formed in the housing 11 so as to connect the coupling ports 12a and 12b. The flow path 13 is provided with a first liquid member flow path 13a, a second liquid member flow path 13b, and a third liquid member flow path 13c which are explained later such that these flow paths are formed in an approximate convex unitarily.

The pressure sensing section 30 is disposed on an upper surface of the housing 11. Here, a plan view of the pressure sensing section 30 is round. The pressure sensing section 30 is supported while a sensor supporting section 14 covers thereon. Also, a base 15 is disposed on an bottom surface of the housing 11. Here, a plan view of the base 15 is rectangular. That is, the housing 11 overlaps the base 15. Furthermore, the sensor supporting section 14 overlaps the housing 11 such that the base 15, the housing 11, and the sensor supporting section 14 are formed unitarily by an engaging section 16 such as a screw.

Also, a cap 17 and a support ring 18 are disposed around the sensor supporting section 14. Here, the cross section of the cap 17 and the support ring 18 is round as a part of the external view of the inline pressure sensor. Here, reference numeral 19 in the drawing indicates an O-ring for sealing the liquid member so as to prevent the liquid member from leaking out of the flow path 13. Reference numeral 20 is a sensor supporting plane which is formed on the housing 11 such that an outer periphery section (a flange section 32, to be explained later) on the pressure sensing section 30 should be supported.

A plan view of the pressure sensing section 30 is round. The pressure sensing section 30 is provided with a pressure sensing plane 31 on a bottom end of the pressure sensing section 30 so as to be parallel with an axial line of the piping section P. The pressure sensing plane 31 is formed on a bottom end surface of a main body 32 of the pressure sensing section 30 which contains a sensor element which is not shown in the drawing. The pressure sensing section 30, as a diaphragm, can be transformed according to a pressure of the liquid member which is introduced in the flow path 13. Here, a fluoride resin such as polytetrafluoroethylene (PTFE) resin is used for such a pressure sensing plane 31 because polytetrafluoroethylene (PTFE) resin has superior anti-corrosion characteristics.

Furthermore, the pressure sensing section 30 is formed by disposing a base board 33 on the main body 32 of the pressure sensing section 30 which is provided with the pressure sensing plane 31. The pressure sensing section 30 is mounted on the O-ring 19 and the sensor supporting plane 20 so as to be supported from beneath. An upper base board 33 is supported by the sensor supporting section 14 via a bracket 34. That is, the flange section 32a which protrudes toward the outer periphery section of the main body 32 of the pressure sensing section is supported on the sensor supporting plane 20 by the pressure sensing plane 31 of the pressure sensing section 30. An outer periphery of the pressure sensing plane 31 is supported by the O-ring 19. By doing this, a central region of the pressure sensing section 30 freely moves (transforms) vertically according to the pressure.

Here, a common strain gauge can be used for a sensor element in the main body 32 of the pressure sensing section.

There is no particular limitation for the sensor element in the main body 32 of the pressure sensing section; therefore, detailed explanation of the structure is omitted.

Here, reference numeral 35 indicates a cable for supplying electricity and transmitting a measured pressure thereoutside.

Hereinafter, the flow path 13 is explained in detail as an important structure in the present invention. The flow path 13 is provided with a region in which the first liquid member flow path (hereinafter called a "first flow path") 13a, the second liquid member flow path (hereinafter called a "second flow path") 13b, and the third liquid member flow path (hereinafter called a "third flow path") 13c are connected unitarily from the coupling port 12a for an entrance for a liquid member toward the coupling port 12b for an exit for a liquid member.

The first flow path 13a switches the direction of the liquid member from the flow path 13 formed so as to be aligned with the piping section P to the pressure sensing plane 31 of the pressure sensing section 30. According to the drawing, the first flow path 13a stands approximately vertically upwardly from the piping section P which is disposed horizontally. It is preferable that the cross sectional area in the first flow path 13a be the same as the cross sectional area in the piping section P. Therefore, diameter of a round cross section of the first flow path 13a is the same as an inner diameter of the piping section P.

The second flow path 13b is formed between the pressure sensing plane 31 and a surface 11a of the housing 11 which faces approximately parallel with the pressure sensing plane 31 by a predetermined interfacial distance T. Here, a plan view is round under conditions that the liquid member which is introduced from the first flow path 13a flows along the pressure sensing plane 31 of the pressure sensing section 30. A round cross sectional area in the second flow path 13b is larger than a cross sectional area in the piping section P in plan view. Therefore, it is possible to form the interfacial distance T so as to be smaller than the inner diameter of the piping section P in order to form the cross sectional area in the second flow path 13b so as to be the cross sectional area in the piping section P. Actually, a connecting section 13d in the first flow path 13a and a connecting section 13e in the third flow path 13c are disposed on a circumference which is orthogonal to a diameter of a circle of which the diameter is aligned with an expanded axial line of the piping section P in plan view. Therefore, it is necessary to determine the interfacial distance T such that a region which neighbors the connecting sections 13d and 13e may have the same cross sectional area as the cross sectional area in the piping section P. Here, it is acceptable if a region which neighbors the connecting sections 13d and 13e may have a slightly larger cross sectional area than the cross sectional area in the piping section P.

Figure 3:
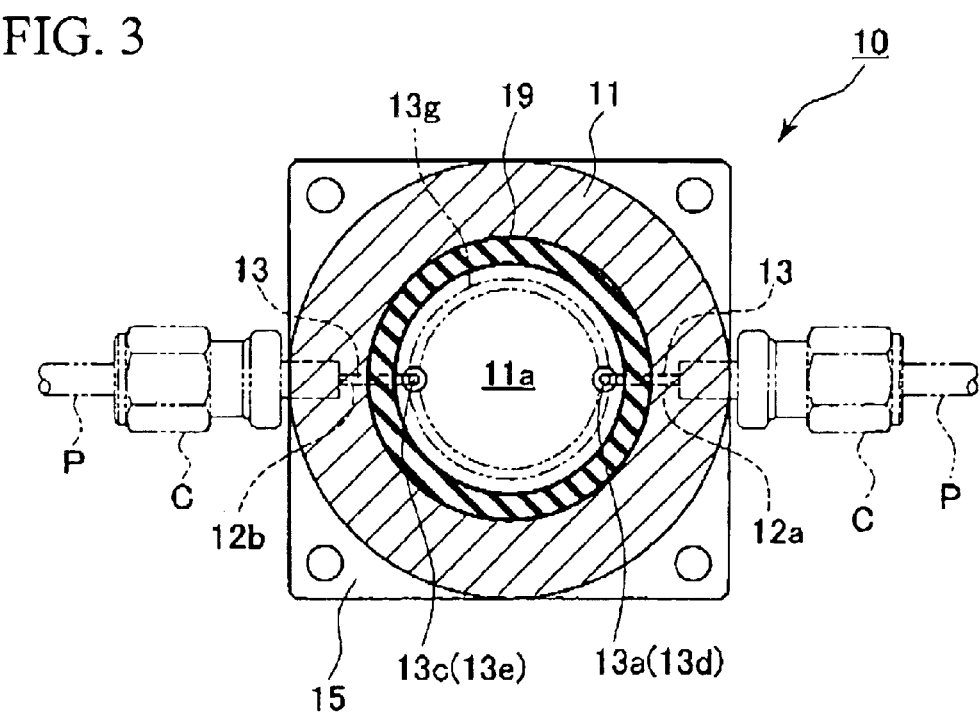
FIG. 3 is a cross section for showing a general structure of the flow path.

Here, if the cross sectional area is increased by disposing a taper plane 13f in the connecting sections 13d and 13e, it is acceptable to form the interfacial distance T smaller by a corresponding amount of the increased cross sectional area. Also, it is alternatively acceptable if the interfacial distance T is formed smaller by forming a ring flow path 13g (indicated virtually by a broken line in FIG. 3) having an appropriate cross sectional shape along inside the O-ring 19 according to necessity.

The third flow path 13c switches a flowing direction of the liquid member from the pressure sensing plane 31 of the pressure sensing section 30 to the flow path 13 which is aligned with the piping section P. According to the drawing, the flowing direction of the liquid member is switched from the horizontal second flow path 13b to a downwardly in approximately vertical direction at first, then switched horizontally toward the piping section P which is disposed horizontally. It is preferable that the cross sectional area in the third flow path 13c should be the same as the cross sectional area in the piping section 13. By doing this, it is possible to form the third flow path 13c so as to have the same cross sectional area as the cross sectional area in the piping section 13.

As explained above, the first flow path 13a which switches the flowing direction of the liquid member from a horizontal piping section 13 to a vertical standing direction, the second flow path 13b through which the liquid member flows along the pressure sensing plane 31 horizontally, and the third flow path 13c which switches the flowing direction of the liquid member downwardly approximately vertically so as to introduce the liquid member to the horizontal piping section P are unitarily connected in the housing 11. Here, the flow path 13 is formed in an approximate convex shape such that both ends of the flow path 13 are connected to the coupling ports 12a and 12b respectively.

In the pressure sensor 10 having the above structure, when the liqfuid member is introduced to the flow path 13 which is connected to the piping section P, the liquid member flows through the first flow path 13a, the second flow path 13b, and the third flow path 13c, in that order. Consequently, the shape of the pressure sensing plane 31 transforms according to the pressure of the liquid member which contacts the pressure sensing section 31 when the liquid member passes through the second flow path 13b. By doing this, a pressure value is outputted according to the transformation which is measured by the sensor element in the main body 32 of the pressure sensing section. In such a case, the cross sectional area of the flow path 13 which is formed in the housing 11 is the same as the cross sectional area in the piping section P over an entire length of the piping section P. Here, it is acceptable if the cross sectional area of the flow path 13 which is formed in the housing 11 is slightly larger than the cross sectional area in the piping section P over an entire length of the piping section P. Therefore, it is possible to realize a sufficient area for sensing the pressure on the pressure sensing plane 31 on the pressure sensing section 30. Thus, it is substantially possible to eliminate the dead space in which the liquid member remains undesirably.

In order to eliminate the dead volume, it is preferable that there be no difference of the level between the piping section P and the second flow path 13b. In other words, it is preferable that there be no difference of the level in a vertical direction between the first flow path 13a and the third flow path 13c. By doing this, the flow path 13 is connected to the piping section P so as to be aligned with the piping section P; thus, it is preferable because the pressure sensor can be formed in a simple structure.

Figure 4:
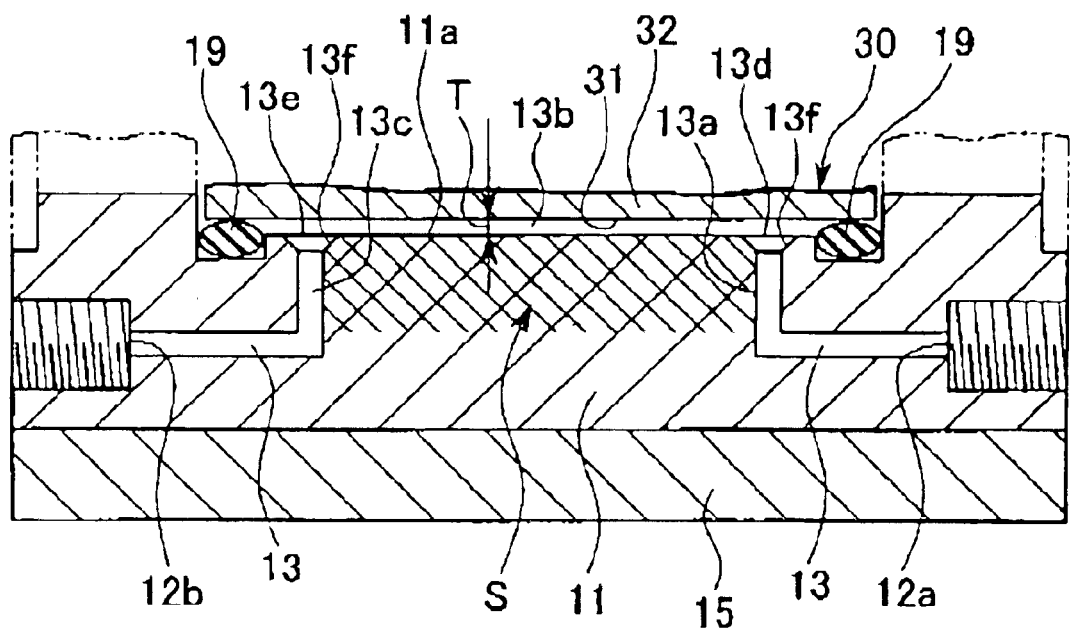
FIG. 4 is an enlarged view of the flow path formed in the housing shown in FIG. 1.
Figure 5:
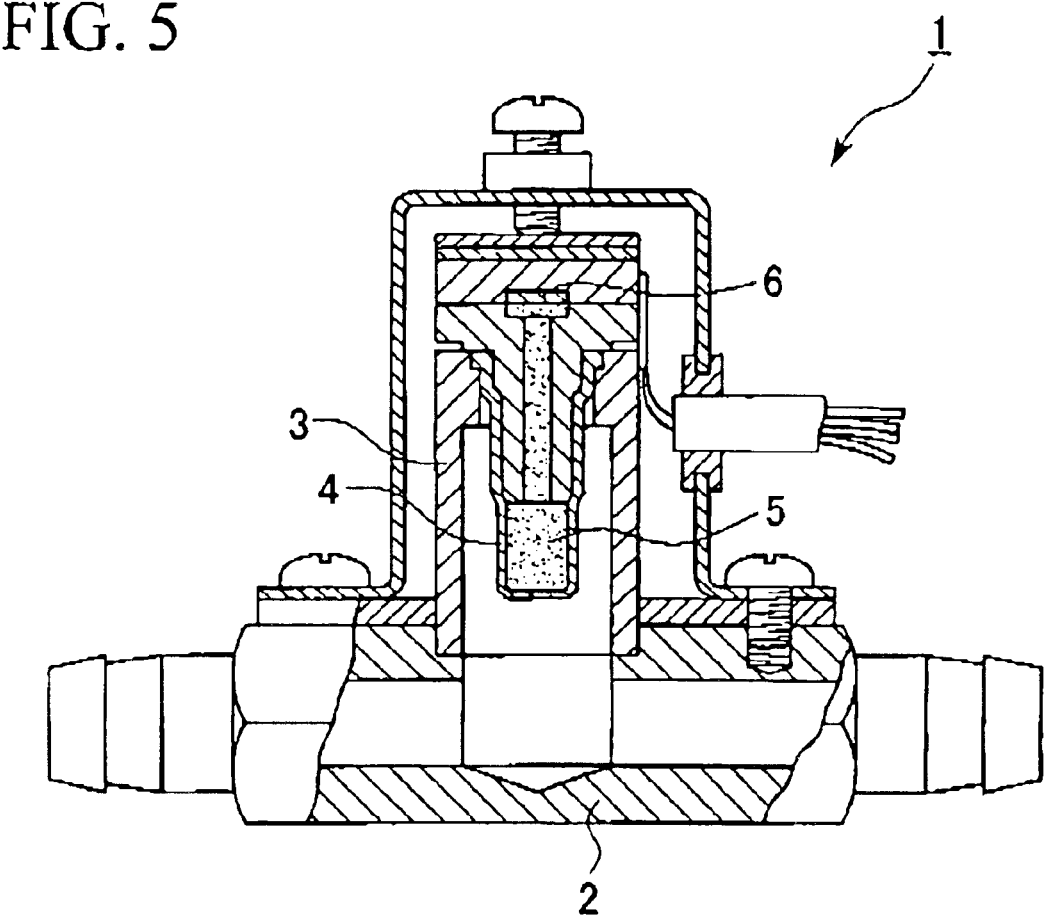
FIG. 5 is a cross section for a general structure of a conventional inline pressure sensor.

However, members such as the O-ring 19 for sealing the liquid member, and the sensor supporting plane 20 on which the flange section 32a of the main body 32 of the pressure sensing section are indispensable in the pressure sensor 10 from a structural point of view. Therefore, a concave space which may form a dead space is formed between the flow path which is formed so as to be aligned with the piping section P and the pressure sensing plane 31 if the flow path and the casing are formed in a step structure in which the above members are disposed. That is, there is a possibility that a dead space S, which is indicated by a hatched section in FIG. 4, may be formed between a linear flow path which connects the first flow path 13a and the third flow path 13c and the second flow path 13b according to the present embodiment. In order to solve such a problem, the flow path 13 is formed in the above approximately convex shape. Also, the difference of the level between the first flow path 13a and the third flow path 13c are minimized. By doing this, the liquid member flows substantially over an entire length of the flow path 13. Therefore, the dead space in which the liquid member hardly flows therein is never formed.

In particular, if a small dead space is formed in the pressure sensor 10 which is supposed to be attached to the piping section P having a small diameter, a ratio of the dead space is relatively large according to an overall volume in the flow path in the pressure sensor. Therefore, there is a possibility that the ratio of the wasted liquid member will increase when the liquid member is expensive; thus, productivity may be worsened. Also, the dead space which is formed in the small diameter piping section can hardly be compensated in contrast to a case in which it is relatively easy to compensate the dead space which is formed in the large diameter piping section. Therefore, there is a possibility that the liquid member may decompose more easily during remaining thereinside for a long period. From this point of view, it is particularly preferable that the present invention be employed for a pressure sensor 10 which is supposed to be attached to a small diameter piping section P. More preferably, the present invention should be employed for a pressure sensor 10 which is supposed to be attached to a piping section P of which the diameter is not greater than ¼ inch (inner diameter: 3.96 mm).

Here, it is understood that, in the preferred embodiments of the invention, various changes and modifications may be made thereto without departing from the spirit and scope of the invention as defined in the appended claims.

For example, in the above explanation, the flowing direction of the liquid member is switched from the piping section P to the approximate vertical direction by the above first flow path 13a and the third flow path 13c. More importantly, it is acceptable if the first flow path 13a and the third flow path 13c are formed at an appropriate slanted angle. Also, regarding the cross sectional area and the shape in the piping section P, the cross sectional area should not be reduced because more pressure will be lost. Here, the cross sectional area should not necessarily be the same as that in the piping section P.

What is claimed is:

1. An inline pressure sensor comprising:

a housing having first to third liquid member flow paths formed by piping sections;

a pressure sensing section disposed in the housing for contacting a liquid member flowing in the flow paths;

a sensor element disposed in the housing for measuring a stress by contacting the pressure sensing section;

a pair of coupling ports disposed on both ends of the housing and connected to the flow paths, one of the flow paths in the coupling ports and one of the flow paths in the piping section being aligned;

the first liquid member flow path being for switching a direction of the liquid member from the aligned flow path to the pressure sensing section;

the second liquid member flow path being for flowing the liquid member along the pressure sensing section; and the third liquid member flow path being for switching a direction of the liquid member from the pressure sensing section to the aligned flow path, wherein the first liquid member flow path, the second liquid member flow path, and the third liquid member flow path are connected in an approximate convex alignment viewed in a cross section, the second liquid member flow path being formed such that a distance between a pressure sensing surface on the pressure sensing section and a surface of the housing facing the pressure sensing section is less than an inner diameter of the flow path, and the second flow path having a round shape viewed horizontally.

2. An inline pressure sensor according to claim 1 wherein a diameter of the liquid member flow path is ¼ inch or smaller.

3. An inline pressure sensor according to claim 1 wherein the first liquid member flow path and the third liquid member flow path are disposed in a slanted manner.

4. An inline pressure sensor according to claim 1 wherein the sensor element has a pressure sensing plane made from a polytetrafluoroethlene (PTFE).

5. An inline pressure sensor according to claim 1, further comprising an O-ring for supporting an overall surface of the sensing element.

6. An inline pressure sensor according to claim 1, further comprising:

a tapered plane formed between a connecting section of the first and second liquid member flow paths; and a tapered plane formed between a connecting section of the second and third liquid member flow paths.

* * * * *